(12) United States Patent
Chen et al.

(10) Patent No.: US 12,408,146 B2
(45) Date of Patent: Sep. 2, 2025

(54) COMMUNICATION METHOD AND APPARATUS (71) Applicant: HUAWEI TECHNOLOGIES CO., LTD., Shenzhen (CN)

(72) Inventors: Lei Chen, Beijing (CN); Bingzhao Li, Beijing (CN); Hong Wang, Beijing (CN); Bin Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 624 days.

(21) Appl. No.: 17/680,938

(22) Filed: Feb. 25, 2022

(65) Prior Publication Data
US 2022/0182986 A1 Jun. 9, 2022

Related U.S. Application Data (63) Continuation of application No. PCT/CN2020/110464, filed on Aug. 21, 2020.

(30) Foreign Application Priority Data

Aug. 30, 2019 (CN) .......................... 201910815830.2

(51) Int. Cl.
H04W 72/02 (2009.01)
H04W 24/08 (2009.01)
(Continued)

(52) U.S. Cl.
CPC .......... *H04W 72/02* (2013.01); *H04W 24/08* (2013.01); *H04W 68/005* (2013.01); *H04W 72/044* (2013.01); *H04W 76/10* (2018.02)

(58) Field of Classification Search
CPC ..... H04W 24/08; H04W 48/12; H04W 48/16; H04W 68/005; H04W 68/02;
(Continued)

(56) References Cited

U.S. PATENT DOCUMENTS

2018/0270713 A1* 9/2018 Park ...................... H04L 5/0053
2018/0270791 A1* 9/2018 Park ...................... H04W 68/04
(Continued)

FOREIGN PATENT DOCUMENTS

CN 108616986 A 10/2018
CN 108811121 A 11/2018
(Continued)

OTHER PUBLICATIONS

Extended European Search Report issued in corresponding European Application No. 20856415.3, dated Sep. 9, 2022, pp. 1-9.
(Continued)

Primary Examiner — Joseph Arevalo
(74) Attorney, Agent, or Firm — HAUPTMAN HAM, LLP (57) ABSTRACT A communication method includes receiving, by a terminal device, first indication information from an access network device, determining a target bandwidth part (BWP) from a plurality of initial BWPs based on the first indication information, and monitoring a paging message in the target BWP. The plurality of initial BWPs are useable to page the terminal device that has not established a radio resource control (RRC) connection to the access network device.

20 Claims, 5 Drawing Sheets (51) Int. Cl.
*H04W 68/00* (2009.01)
*H04W 72/044* (2023.01)
*H04W 76/10* (2018.01)

(58) Field of Classification Search
CPC .............. H04W 72/02; H04W 72/044; H04W 72/0453; H04W 76/10
USPC ....... 370/329, 252, 328, 331, 503, 312, 330, 370/311
See application file for complete search history.

(56) References Cited

U.S. PATENT DOCUMENTS

| | | | |
|---|---|---|---|
| 2018/0270895 A1* | 9/2018 | Park | H04W 76/38 |
| 2019/0104554 A1 | 4/2019 | Amuru et al. | |
| 2019/0132857 A1 | 5/2019 | Babaei et al. | |
| 2019/0141695 A1 | 5/2019 | Babaei et al. | |
| 2019/0149380 A1* | 5/2019 | Babaei | H04W 72/23 370/330 |
| 2019/0215863 A1 | 7/2019 | Kim et al. | |
| 2019/0261425 A1 | 8/2019 | Kyungmin et al. | |
| 2019/0305916 A1* | 10/2019 | Liao | H04L 5/0092 |
| 2019/0320492 A1* | 10/2019 | Yang | H04W 76/28 |
| 2020/0037380 A1* | 1/2020 | Qiu | H04W 68/12 |
| 2020/0137718 A1* | 4/2020 | Agiwal | H04W 76/27 |
| 2020/0351818 A1* | 11/2020 | Park | H04W 52/0216 |
| 2021/0006383 A1* | 1/2021 | Ji | H04W 72/1263 |
| 2022/0158793 A1* | 5/2022 | Selvaganapathy | H04L 27/2602 |
| 2022/0264518 A1* | 8/2022 | Da Silva | H04W 76/27 |

FOREIGN PATENT DOCUMENTS

| | | |
|---|---|---|
| CN | 109309950 A | 2/2019 |
| CN | 109588058 A | 4/2019 |
| CN | 110166215 A | 8/2019 |
| EP | 3471329 A1 | 4/2019 |
| EP | 3675407 A1 | 7/2020 |
| KR | 20190044022 A | 4/2019 |
| WO | 2019096254 A1 | 5/2019 |
| WO | 2019158366 A1 | 8/2019 |

OTHER PUBLICATIONS

MediaTek Inc., Summary of Bandwidth Part Remaining Issues. 3GPP TSG RAN WG1 Meeting #94bis, Chengdu, China, Oct. 8-Oct. 12, 2018, R1-1811850, 25 pages.

Ericsson, Notification and retrieval of updated SI for a UE in an active DL BWP. 3GPP TSG-RAN WG2 NR AH#3, Vancouver, Canada, Jan. 22-26, 2018, R2-1800294, 5 pages.

Huang Chenheng, Review on Physical Layer Key Technology of 3GPP 5G NR. Mobile Communications, 2018,42 (10): 1-8.

Intel Corporation, Alternative Implementation of the 6-1 BWP UE feature requirement. 3GPP TSG RAN WG2 Meeting #AH, Montreal, Canada, Jul. 2-6, 2018, R2-1810408, 6 pages.

International Search Report issued in corresponding International Application No. PCT/CN2020/110464, dated Nov. 27, 2020, pp. 1-9.

Chinese Office Action issued in corresponding Chinese Application No. 201910815830.2, dated Jul. 14, 2021, pp. 1-12.

Chinese Notice of Allowance issued in corresponding Chinese Application No. 201910815830.2, dated Feb. 7, 2022, pp. 1-4.

* cited by examiner

COMMUNICATION METHOD AND APPARATUS

CROSS-REFERENCE TO RELATED APPLICATIONS

This application is a continuation of International Application No. PCT/CN2020/110464, filed on Aug. 21, 2020, which claims priority to Chinese Patent Application No. 201910815830.2, filed on Aug. 30, 2019. The disclosures of the aforementioned applications are hereby incorporated by reference in their entireties.

TECHNICAL FIELD

Embodiments of this application relate to the communication field, and in particular, to a communication method and apparatus.

BACKGROUND

A new radio (NR) frequency band in a $5^{th}$ generation (5G) mobile communication system is wider than a long term evolution (LTE) frequency band. Because radio frequency capabilities of different terminal devices are different, bandwidths supported by the terminal devices are different. Therefore, a concept of a bandwidth part (BWP) is introduced. A part of spectrum is allocated to a terminal device in a bandwidth, to adapt to a bandwidth that can be supported by the terminal device. In addition, flexible scheduling and energy-saving control of the terminal device can be implemented by configuring a plurality of BWPs with different bandwidths for the terminal device.

An initial bandwidth part (initial BWP) is a frequency band in a bandwidth, and is used to page a terminal device that camps on a cell and that is in an idle state or in an inactive state. When a service of the terminal device arrives, an access network device schedules the terminal device from the initial BWP to a BWP that matches the service, to transmit the service of the terminal device. In a conventional technology, bandwidths of initial BWPs supported by NR are 5 M, 10 M, and 20 M, while in machine type communication (MTC), an MTC terminal device does not support bandwidths of 10 M and 20 M. To meet a requirement of the MTC terminal device, an initial BWP with a narrower bandwidth needs to be separately designed.

However, when there are a plurality of initial BWPs in a communication system, the access network device cannot determine an initial BWP in which a paging message is sent to the terminal device.

SUMMARY

Embodiments of this application provide a communication method and apparatus, to resolve a problem in a conventional technology that when there are a plurality of initial BWPs in a communication system, an access network device cannot determine an initial BWP in which a paging message is sent to a terminal device.

According to a first aspect, an embodiment of this application provides a communication method. In the method, a terminal device receives first indication information from an access network device. Then, the terminal device may determine a target bandwidth part BWP from a plurality of initial BWPs based on the first indication information. The initial BWP is used to page a terminal device that has not established a radio resource control RRC connection to the access network device. Subsequently, the terminal device monitors a paging message in the target BWP.

In the foregoing method, the access network device sends the first indication information to the terminal device, to indicate the terminal device to determine the target bandwidth part BWP from the plurality of initial BWPs. In this way, when there are a plurality of initial BWPs in a communication system, the terminal device may determine the target BWP for camping, and the access network device sends the paging message to the terminal device in the target BWP, so that precise paging in the initial BWP can be implemented.

In a possible implementation, the first indication information is carried on a first broadcast channel PBCH.

Based on the possible implementation, the terminal device may obtain the first indication information from the PBCH, so that the terminal device may receive, before camping on the initial BWP, the first indication information sent by the access network device.

In a possible implementation, the first indication information is carried in a system information block 1 SIB1.

In a possible implementation, the method further includes: The terminal device reads the SIB1 in a first initial BWP; and that the terminal device determines a target bandwidth part BWP from a plurality of initial BWPs based on the first indication information includes: The terminal device determines, based on the first indication information, that the target BWP is a second initial BWP, where the second initial BWP is different from the first initial BWP, and the first initial BWP and the second initial BWP belong to the plurality of initial BWPs.

Based on the possible implementation, the terminal device may obtain the first indication information from the SIB1, so that the terminal device may first camp in the first initial BWP, and then begin to camp on the second initial BWP after receiving the indication information.

In a possible implementation, the first indication information includes at least one parameter.

That the terminal device determines a target bandwidth part BWP from a plurality of initial BWPs based on the first indication information includes:

The terminal device determines the target bandwidth part BWP from the plurality of initial BWPs based on the at least one parameter.

In a possible implementation, the at least one parameter includes at least one parameter related to an identifier of the terminal device.

Based on the possible implementation, the terminal device may determine the target BWP by using the parameter in the first indication information, and the access network device sends the paging message to the terminal device in the target BWP, so that precise paging in the initial BWP can be implemented.

In a possible implementation, the first indication information is used to indicate the target BWP, or the first indication information is identification information of the target BWP.

Based on the first aspect, in a possible design, the first indication information includes status information of at least one bit, or the first indication information is bitmap information.

Based on the possible implementation, the terminal device may directly indicate the target BWP by using the first indication information, and the access network device sends the paging message to the terminal device in the target BWP, so that precise paging in the initial BWP can be implemented.

According to a second aspect, an embodiment of this application provides a communication method. In the method, a terminal device reports first information to a core network device, where the first information includes type information of the terminal device.

In a design of the second aspect, the terminal device may separately report the first information to an access network device, or may report the first information to the core network device based on the design of the first aspect.

In a possible implementation, a target BWP is corresponding to a type of the terminal device.

According to a third aspect, an embodiment of this application provides a communication method. In the method, an access network device sends first indication information to a terminal device, where the first indication information is used to indicate a target BWP in a plurality of initial BWPs, and the initial BWP is used to page a terminal device that has not established a radio resource control RRC connection to the access network device; and the access network device sends a paging message to the terminal device in the target BWP.

In a possible implementation, the first indication information is carried on a first broadcast channel PBCH.

In a possible implementation, the first indication information is carried in a system information block 1 SIB1.

In a possible implementation, before the access network device sends the first indication information to the terminal device, the method further includes: The access network device sends the SIB1 in a first initial BWP; and the sending a paging message to the terminal device in the target BWP includes: The access network device sends the paging message in a second initial BWP based on the first indication information, where the second initial BWP is different from the first initial BWP, and the first initial BWP and the second initial BWP belong to the plurality of initial BWPs.

In a possible implementation, the first indication information includes at least one parameter.

In a possible implementation, the at least one parameter includes at least one parameter related to an identifier of the terminal device.

In a possible implementation, the first indication information is used to indicate the target BWP, or the first indication information is identification information of the target BWP.

In a possible implementation, the first indication information includes status information of at least one bit, or the first indication information is bitmap information.

According to a fourth aspect, an embodiment of this application provides a communication method. In the method, an access network device receives paging information from a core network device, where the paging message includes type information of a terminal device.

In a possible implementation, a target BWP is corresponding to a type of the terminal device.

In the communication method provided in the fourth aspect, the core network device may separately send the type information of the terminal device to the access network device, or may send the type information of the terminal device to the access network device based on the design of the third aspect.

According to a fifth aspect, an embodiment of this application provides a communication method. In the method, a core network device receives first information sent by a terminal device, where the first information includes type information of the terminal device; and the core network device sends a paging message to an access network device, where the paging message includes the type information of the terminal device.

In a possible implementation, a target BWP is corresponding to a type of the terminal device.

According to a sixth aspect, an embodiment of this application provides a communication apparatus, and the communication apparatus includes: a receiving module, configured to receive first indication information from an access network device; and a processing module, configured to determine a target bandwidth part BWP from a plurality of initial BWPs based on the first indication information, where the initial BWP is used to page a terminal device that has not established a radio resource control RRC connection to the access network device. The processing module is further configured to monitor a paging message in the target BWP.

It should be noted that the communication apparatus provided in the sixth aspect may be the terminal device itself, or may be an internal component or an integrated circuit of the terminal device, for example, a chip.

In a possible implementation, the first indication information is carried on a first broadcast channel PBCH.

In a possible implementation, the first indication information is carried in a system information block 1 SIB1.

In a possible implementation, the processing module is further configured to read the SIB1 by the terminal device in a first initial BWP. The processing module is specifically configured to determine, based on the first indication information, that the target BWP is a second initial BWP, where the second initial BWP is different from the first initial BWP, and the first initial BWP and the second initial BWP belong to the plurality of initial BWPs.

In a possible implementation, the first indication information includes at least one parameter. The processing module is specifically configured to determine the target bandwidth part BWP from the plurality of initial BWPs based on the at least one parameter.

In a possible implementation, the at least one parameter includes at least one parameter related to an identifier of the terminal device.

In a possible implementation, the first indication information is used to indicate the target BWP, or the first indication information is identification information of the target BWP.

In a possible implementation, the first indication information includes status information of at least one bit, or the first indication information is bitmap information.

In a possible implementation, the terminal device includes a sending module, configured to report first information to a core network device, where the first information includes type information of the terminal device.

In a possible implementation, the target BWP is corresponding to a type of the terminal device.

According to a seventh aspect, an embodiment of this application provides a communication apparatus, and the communication apparatus includes: a sending module, configured to send first indication information to a terminal device, where the first indication information is used to indicate a target BWP in a plurality of initial BWPs, and the initial BWP is used to page a terminal device that has not established a radio resource control RRC connection to an access network device; and a processing module, configured to send a paging message to the terminal device in the target BWP.

It should be noted that the communication apparatus provided in the seventh aspect may be the access network device itself, or may be an internal component or an integrated circuit of the access network device, for example, a chip.

In a possible implementation, the access network device further includes a receiving module, configured to receive paging information from a core network device, where the paging message includes type information of the terminal device.

In a possible implementation, the target BWP is corresponding to a type of the terminal device.

In a possible implementation, the first indication information is carried on a first broadcast channel PBCH.

In a possible implementation, the first indication information is carried in a system information block 1 SIB1.

In a possible implementation, the sending module is further configured to send the SIB1 in a first initial BWP. The sending module is specifically configured to send the paging message in a second initial BWP based on the first indication information, where the second initial BWP is different from the first initial BWP, and the first initial BWP and the second initial BWP belong to the plurality of initial BWPs.

In a possible implementation, the first indication information includes at least one parameter.

In a possible implementation, the at least one parameter includes at least one parameter related to an identifier of the terminal device.

In a possible implementation, the first indication information is used to indicate the target BWP, or the first indication information is identification information of the target BWP.

In a possible implementation, the first indication information includes status information of at least one bit, or the first indication information is bitmap information.

According to an eighth aspect, an embodiment of this application provides a communication apparatus, and the communication apparatus includes: a receiving module, configured to receive first information sent by a terminal device, where the first information includes type information of the terminal device; and a sending module, configured to send a paging message to an access network device, where the paging message includes the type information of the terminal device.

It should be noted that the communication apparatus provided in the eighth aspect may be a core network device itself, or may be an internal component or an integrated circuit of the core network device, for example, a chip.

In a possible implementation, a target BWP is corresponding to a type of the terminal device.

According to a ninth aspect, an embodiment of this application provides a communication apparatus, including a processor and a transceiver. The processor and the transceiver are configured to perform the communication method according to the first aspect or the second aspect.

According to a tenth aspect, an embodiment of this application provides a communication apparatus, including a processor and a transceiver. The processor and the transceiver are configured to perform the communication method according to the third aspect or the fourth aspect.

According to an eleventh aspect, an embodiment of this application provides a communication apparatus, including a processor and a transceiver. The processor and the transceiver are configured to perform the communication method according to the fifth aspect.

According to a twelfth aspect, an embodiment of this application provides a chip, including a memory and a processor, where the memory is configured to store program instructions, and the processor is configured to invoke the program instructions in the memory to perform the communication method according to the first aspect or the second aspect.

According to a thirteenth aspect, an embodiment of this application provides a chip, including a memory and a processor, where the memory is configured to store program instructions, and the processor is configured to invoke the program instructions in the memory to perform the communication method according to the third aspect or the fourth aspect.

According to a fourteenth aspect, an embodiment of this application provides a chip, including a memory and a processor, where the memory is configured to store program instructions, and the processor is configured to invoke the program instructions in the memory to perform the communication method according to the fifth aspect.

According to a fifteenth aspect, an embodiment of this application provides a readable storage medium, where the readable storage medium stores a computer program; and when the computer program is executed, the communication method according to the first aspect or the second aspect is implemented.

According to a sixteenth aspect, an embodiment of this application provides a readable storage medium, where the readable storage medium stores a computer program; and when the computer program is executed, the communication method according to the third aspect or the fourth aspect is implemented.

According to a seventeenth aspect, an embodiment of this application provides a readable storage medium, where the readable storage medium stores a computer program; and when the computer program is executed, the communication method according to the fifth aspect is implemented.

According to an eighteenth aspect, an embodiment of this application provides a program product, where the program product includes a computer program, and the computer program is stored in a readable storage medium. At least one processor of a communication apparatus may read the computer program from the readable storage medium, and the at least one processor executes the computer program, to enable the communication apparatus to implement the communication method according to the first aspect or the second aspect.

According to a nineteenth aspect, an embodiment of this application provides a program product, where the program product includes a computer program, and the computer program is stored in a readable storage medium. At least one processor of a communication apparatus may read the computer program from the readable storage medium, and the at least one processor executes the computer program, to enable the communication apparatus to implement the communication method according to the third aspect and the fourth aspect.

According to a twentieth aspect, an embodiment of this application provides a program product, where the program product includes a computer program, and the computer program is stored in a readable storage medium. At least one processor of a communication apparatus may read the computer program from the readable storage medium, and the at least one processor executes the computer program, to enable the communication apparatus to implement the communication method according to the fifth aspect.

In this application, the terminal device receives the first indication information from the access network device, determines the target bandwidth part BWP from the plurality of initial BWPs based on the first indication information, and monitors the paging message in the target BWP. In this way, when there are the plurality of initial BWPs in the communication system, the terminal device may determine the target BWP for camping, and the access network device sends the paging message to the terminal device in the target BWP, so that load balancing and precise paging in the initial BWP can be implemented.

DESCRIPTION OF EMBODIMENTS

It should be understood that, terms such as "first" and "second" in the embodiments of this application are intended to distinguish between similar objects but do not necessarily indicate a specific order or sequence. It should be understood that terms used in such a way are interchangeable in proper circumstances, so that the embodiments of this application described herein can be implemented in an order except the order illustrated or described herein.

Terms used in the embodiments of this application are first explained.

Machine type communication (machine type communication, MTC) is a type of data communication between machines without human intervention, and is characterized by diverse service modes and a large quantity of terminals. MTC includes core MTC and massive MTC. The core MTC is mainly applied to a low-latency and high-reliability application scenario. The massive MTC is used to meet massive data connections and can be applied to massive IoT services in 5G. The massive MTC features scalability and flexible bandwidth, and is mainly applicable to application scenarios that target sensors and data collection.

Bandwidth part (bandwidth part, BWP): A person skilled in the art may understand that a BWP technology implements bandwidth adaptation. Technically, the BWP refers to a part of spectrum allocated to a terminal device in a bandwidth, to adapt to a bandwidth that can be supported by the terminal device. A proper BWP may be configured by using the BWP technology for the terminal device based on a service volume of a system. When the service volume is high, a small BWP is configured for the terminal device; and when the service volume is low, a large BWP is configured for the terminal device. In this way, frequency band resources are saved. In addition, a sampling rate of the terminal device is reduced, and energy consumption of the terminal device is reduced.

Initial BWP: An initial BWP is a BWP in which a terminal device works after camping on a cell, and includes an uplink initial BWP and a downlink initial BWP. The terminal device may receive at least one of system information and a paging message in the downlink initial BWP. In addition, the terminal device may send a preamble in the uplink initial BWP, and receive a random access response in the downlink initial BWP. In addition, because the initial BWP has a narrower bandwidth than another BWP, and power is saved when the terminal device works in the initial BWP, when switching from a radio resource control RRC connected state to a radio resource control RRC idle state, the terminal device works in the initial BWP. In this application, unless otherwise specified, the initial BWP may refer to the downlink initial BWP, or may refer to both the uplink and the downlink initial BWP.

Figure 1:
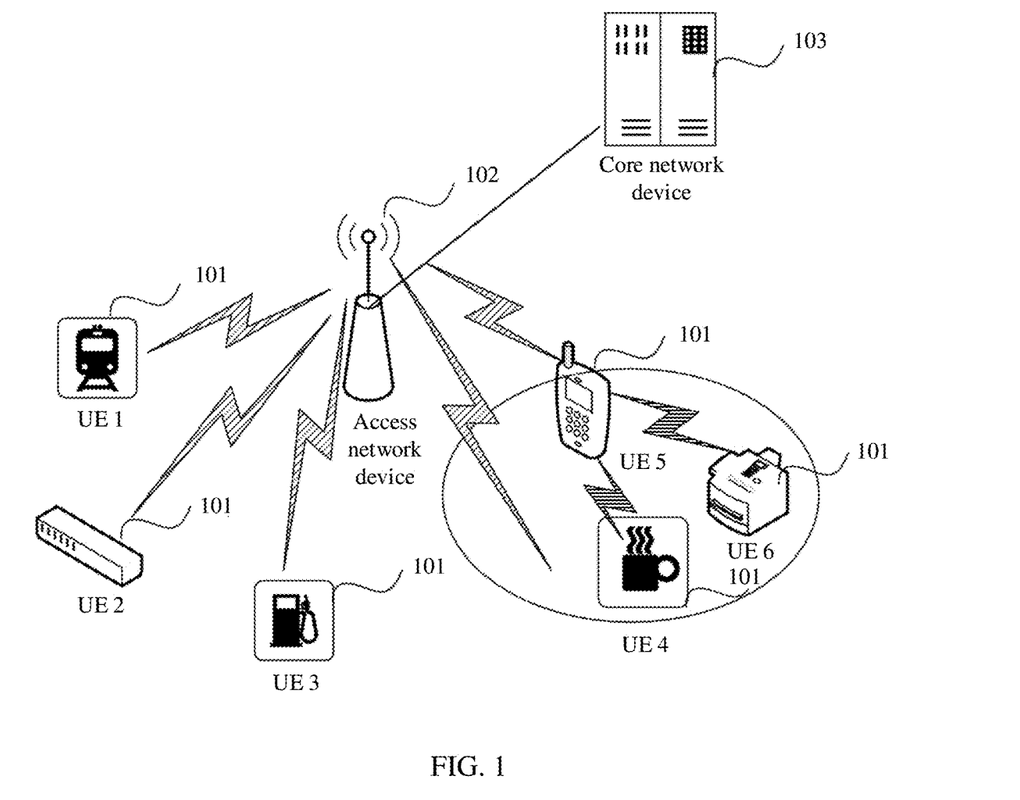
FIG. 1 is a schematic diagram of a communication system according to an embodiment of this application.

FIG. 1 is a schematic diagram of a communication system according to an embodiment of this application. As shown in FIG. 1, the communication system includes a terminal device 101, an access network device 102, and a core network device 103. The terminal device 101 may be connected to the access network device 102, and the access network device 102 may be connected to the core network device 103. The core network device 103 and the access network device 102 may be different independent physical devices, a function of the core network device 103 and a logical function of the access network device 102 may be integrated into one physical device, or some functions of the core network device 103 and some functions of the access network device 102 may be integrated into one physical device. The terminal device 101 may be at a fixed location or may be movable. FIG. 1 is merely a schematic diagram. The communication system may further include another device, for example, a wireless relay device and a wireless backhaul device, which are not shown in FIG. 1. Quantities of core network devices 103, access network devices 102, and terminal devices 101 included in the communication system are not limited in this embodiment of this application.

The terminal device 101 may also be referred to as a terminal (Terminal), user equipment (user equipment, UE), a mobile station (mobile station, MS), a mobile terminal (mobile terminal, MT), or the like. The terminal device 101 may be a mobile phone (mobile phone), a pad (pad), a computer that has wireless transceiver functions, a virtual reality (virtual reality, VR) terminal device, an augmented reality (augmented reality, AR) terminal device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. The terminal device may be applied to a 5G network, or even a future 6G network or 7G network.

The access network device 102 may be a base station or various wireless access points, or may be a device that communicates with user equipment over an air interface by using one or more sectors in an access network. The base station may be configured to mutually convert a received over-the-air frame and an IP, and serve as a router between a wireless terminal and a remaining part of the access network, where the remaining part of the access network may include an internet protocol (IP) network. The base station may coordinate attribute management for the air interface. For example, the base station may be a base transceiver station (base transceiver station, BTS) in global system for mobile communications (GSM) or code division multiple access (CDMA), may be a NodeB (NB) in wideband code division multiple access (WCDMA), or may be an evolved NodeB (evolutional nodeB, eNB, or eNodeB) in long term evolution (LTE), a relay station, an access point, a base station gNB in a 5G network, or even a base station in a future 6G network or a base station in a future 7G network. This is not limited herein.

The core network device 103 may be an entity configured to control the terminal device 101 or send data to the terminal device 101. The core network device 103 may include an access and mobility management function (AMF) network element and a session management function (SMF) network element. The core network device 103 may be, for example, a 5G core network device, a future 6G core network device, or a future 7G core network device.

The terminal device 101, the access network device 102, and the core network device 103 can be deployed on land, including indoor or outdoor and handheld or vehicle-mounted devices, may be deployed on a water surface, or may be deployed on an airplane, a balloon and a satellite in the air. An application scenario of a radio access network device 120 and the terminal device is not limited in this embodiment of this application.

It should be noted that the foregoing communication system may be an NR communication system, or may be another system in which a transmission direction needs to be specified. This is not limited herein in this application. FIG. 1 is a schematic diagram in which an NR communication system is used as an example. The following application documents use the NR communication system as an example for description and introduction.

In a conventional technology, bandwidths of initial BWPs supported by NR are 5 M, 10 M, and 20 M, while in machine type communication (machine type communication, MTC), an MTC terminal device does not support bandwidths of 10 M and 20 M. The initial BWP is used to page a terminal device that has not established a radio resource control RRC connection to an access network device, and the MTC terminal device needs to first camp on the initial BWP to monitor a paging message. Subsequently, after the RRC connection is established to the access network device, a service is transmitted in an active BWP. That the terminal device camps on the initial BWP means that the terminal device works in the initial BWP, and the terminal device may receive system information, paging, and a random access response by using the initial BWP.

Because the initial BWP supported by the MTC terminal device is narrower, to meet a requirement of the MTC terminal device, an initial BWP with a narrower bandwidth needs to be separately designed based on the original initial BWP. However, when there are a plurality of initial BWPs in a communication system, the access network device cannot determine an initial BWP in which the paging message is sent to the terminal device.

In view of the foregoing problem, the embodiments of this application provide a communication method, a terminal device and an access network device, so that when there are a plurality of target BWPs in a communication system, the access network device may send a paging message to the terminal device in a target BWP.

It should be noted that this application may not only be applicable to a fifth-generation mobile communication system, but also be applicable to any communication system that includes a plurality of initial BWPs. This is not limited in this application.

The following describes in detail the communication method provided in this application by using specific embodiments. It should be noted that the following several specific embodiments may be mutually combined. Same or similar content is not repeatedly described in different embodiments.

Figure 2:
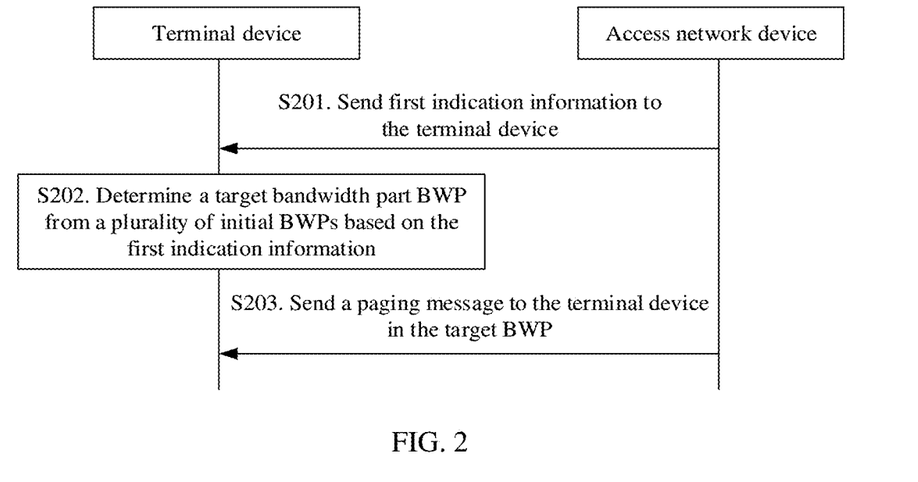
FIG. 2 is a signaling exchanging diagram of a communication method according to an embodiment of this application.

FIG. 2 is a signaling exchanging diagram of a communication method according to an embodiment of this application. Refer to FIG. 2. The method in this embodiment includes the following steps.

Step S201. An access network device sends first indication information to a terminal device.

Step S202. The terminal device determines a target bandwidth part BWP from a plurality of initial BWPs based on the first indication information. Further, the initial BWP is used to page a terminal device that has not established a radio resource control RRC connection to the access network device. Alternatively, the initial BWP is used to page a terminal device that has not currently established an RRC connection to the access network device.

In this embodiment, the terminal device obtains information about a cell by using a cell defined (cell defined) information block (SSB) and accesses the cell. Subsequently, the access network device may send the first indication information to the terminal device, so that the terminal device determines the target BWP from the plurality of initial BWPs, and monitors a paging message in the target BWP. An operation of monitoring the paging message in the target BWP may also be referred to as a camping operation. The operation may not only mean that the terminal device monitors the paging message in the target BWP, but also mean that the terminal device collects other system information except a master information block (MIB) in the target BWP. Alternatively, the operation may further mean that the terminal device works in at least one of the target BWP when switching from an RRC connected state to an RRC idle state or an RRC inactive state.

A communication system may include the initial BWP and an active BWP. The initial BWP is used to page the terminal device that has not established the RRC connection to the access network device, and the active BWP is used to transmit a service of the terminal device after the terminal device establishes the RCC connection to the access network device.

It should be noted that there may be two or more initial BWPs. A quantity of initial BWPs is not limited in this embodiment of this application. For bandwidths of a plurality of initial BWPs, bandwidths of some initial BWPs may be supported by a first-type terminal device, or bandwidths of all initial BWPs may be supported by the first-type terminal device. This is not limited in this embodiment of this application. It should be noted herein that a quantity of types of terminal devices is not limited in this embodiment of this application. In addition to the first-type terminal device, there may be a second-type terminal device or more types of terminal devices.

In addition, in an optional implementation, bandwidths of at least two initial BWPs in the plurality of initial BWPs may be different.

For example, an NR communication system includes an initial BWP with a bandwidth of 5 megabytes (megabyte, M), an initial BWP with a bandwidth of 10 M, and an initial BWP with a bandwidth of 20 M. An MTC terminal device supports only the initial BWP of 5 M. A general-purpose terminal device supports the initial BWP of 5 M, the initial BWP with the bandwidth of 10 M, and the initial BWP with the bandwidth of 20 M. Because there are a plurality of initial BWPs, the access network device needs to send the first indication information to the terminal device, to indicate the terminal device to determine a target BWP from the plurality of initial BWPs.

In at least one terminal device that accesses the communication system, the access network device may send the first indication information to any terminal device in the at least one terminal device, send the first indication information to a plurality of terminal devices, or send indication information to all terminal devices.

The first indication information may be sent to the terminal device when the terminal device accesses the cell, or may be periodically sent to the terminal device in the RRC idle state and the RRC inactive state based on a specific sending periodicity after the terminal device accesses the cell. The sending periodicity of the first indication information may be pre-configured when the access network device is installed, or when the access network device is delivered from a factory. If the sending periodicity of the first indication information is not configured in the access network device, the access network device may define or set the sending periodicity. For example, the access network device sends the first indication information to the terminal device that accesses the cell and that is in the RRC idle state and the RRC inactive state every two seconds.

The first indication information may be generated based on external information, may be generated based on a preset camping proportion of each bandwidth, or may be generated according to a preset camping rule. A manner of generating the first indication information is not limited in this embodiment of this application.

In an optional manner, the camping rule may be a mapping relationship between the terminal device and the initial BWP. In another optional manner, the camping rule may be a camping priority of the initial BWP.

For example, if the communication system includes an initial BWP with a bandwidth of 5 M and an initial BWP with a bandwidth of 10 M, a first-type terminal device that accesses the communication system may camp on the initial BWP with the bandwidth of 5 M, and a second-type terminal device that accesses the communication system may camp on the initial BWP with the bandwidth of 5 M and the initial BWP with the bandwidth of 10 M.

If the camping rule is determining the mapping relationship between the terminal device and the initial BWP, the first-type terminal device may have a mapping relationship with the initial BWP of 5 M, and the second-type terminal device may have a mapping relationship with the initial BWP of 10 M. The first indication information generated based on the mapping relationship may indicate that a target BWP of the first-type terminal device is the initial BWP of 5 M, and indicate that a target BWP of the second-type is the initial BWP of 10 M.

If the camping rule is the camping priority of the initial BWP, a camping priority of the initial BWP of 10 M may be set to be the highest. The first indication information generated based on the camping priority may indicate the terminal device to preferentially use the initial BWP of 10 M as the target BWP. For a terminal device that does not support camping on the initial BWP of 10 M, the initial BWP of 5 M is used as the target BWP.

In an optional implementation, after determining the target BWP, the terminal device may further send response information to the access network device, so that the access network device determines that the terminal device successfully camps in the target BWP.

Step S203. The access network device sends the paging message to the terminal device in the target BWP.

In this step, because the first indication information in step S201 is sent by the access network device to the terminal device, the access network device may determine the target BWP of the terminal device. After receiving the paging message sent by a core network device, the access network device sends the paging message to the terminal device in the target BWP.

The access network device may fail to determine the target BWP of the terminal device due to information loss or the like. In an optional implementation, if the access network device cannot determine the target BWP of the terminal device, the access network device may send the paging message on all initial BWPs of the cell. Efficiency of sending the paging message on all the initial BWPs of the cell is lower than that of sending the paging message only in the target BWP.

In the communication method provided in this embodiment of this application, the terminal device receives the first indication information from the access network device, determines the target bandwidth part BWP from the plurality of initial BWPs based on the first indication information, and monitors the paging message in the target BWP. In this way, when there are a plurality of initial BWPs in a communication system, the terminal device may determine the target BWP for camping, and the access network device sends the paging message to the terminal device in the target BWP, so that precise paging in the initial BWP can be implemented.

It should be understood that, sequence numbers of the foregoing processes do not mean an execution sequence. The execution sequence of the processes should be determined based on functions and internal logic of the processes. The sequence numbers should not constitute any limitation on the implementation processes of the embodiments of this application.

The following describes a message that is of the access network device and that carries the first indication information.

Based on the foregoing embodiment, the first indication information may be carried in different messages of the access network device. For example, the first indication information is carried on a first broadcast channel (PBCH), or the first indication information is carried in a system information block 1 (SIB1).

For example, if the first indication information is carried on the first PBCH, the terminal device may read the first PBCH when obtaining information about the cell by using a cell defined SSB. Therefore, when the terminal device accesses the cell, the terminal device may read the first indication information through the first PBCH. Specifically, the first indication information may be carried in a master information block (MIB) on the first PBCH.

Figure 3:
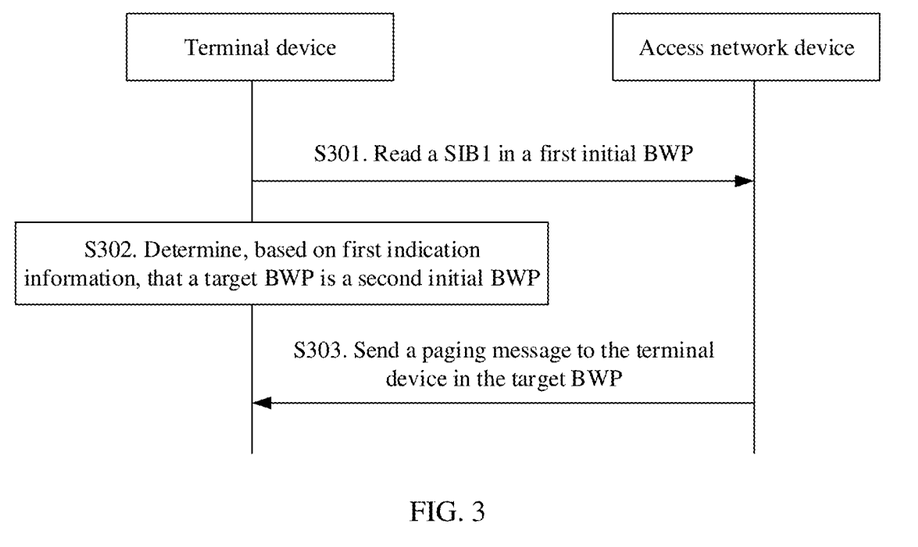
FIG. 3 is another signaling exchanging diagram of a communication method according to an embodiment of this application.

The following describes in detail a case in which the first indication information is carried in the system information block 1. FIG. 3 is another signaling exchanging diagram of a communication method according to an embodiment of this application. Refer to FIG. 3. The method in this embodiment includes the following steps.

Step S301. A terminal device reads a SIB1 in a first initial BWP.

In this step, if the first initial BWP supports all types of terminals that access a cell, before receiving first indication information sent by an access network device, a terminal device may first camp in the first initial BWP, and read the SIB1 in the first initial BWP.

Corresponding SIBs are set for a plurality of initial BWP, and the terminal device may read, from an initial BWP on which the terminal device camps, the SIB corresponding to the initial BWP. For example, a communication system includes the first initial BWP and a second initial BWP, where the first initial BWP corresponds to the SIB1, and the second initial BWP corresponds to a SIB2. If the terminal device camps in the first initial BWP, the terminal device may read the SIB1 in the first initial BWP.

Step S302. The terminal device determines, based on the first indication information, that a target BWP is the second initial BWP, where the second initial BWP is different from the first initial BWP, and the first initial BWP and the second initial BWP belong to the plurality of initial BWPs.

In this step, for the terminal device that reads the first indication information in the SIB1 in the first initial BWP, the access network device may indicate that a target BWP of the terminal device is the first initial BWP, or may indicate that the target BWP of the terminal device is the second initial BWP.

If the terminal device determines, based on the first indication information, that the target BWP is the second initial BWP, the terminal device begins to camp on the second initial BWP instead of the first initial BWP.

For example, if the communication system includes an initial BWP with a bandwidth of 5 M and an initial BWP with a bandwidth of 10 M, the terminal device that accesses the communication system may camp on both the initial BWP with the bandwidth of 5 M and the initial BWP with the bandwidth of 10 M. After the terminal device camps on the initial BWP with the bandwidth of 10 M and reads the first indication information in the SIB1, where the first indication information indicates that the target BWP of the terminal device is the initial BWP with the bandwidth of 5 M, the terminal device begins to camp on the initial BWP with the bandwidth of 5 M.

In another possible implementation, if the terminal device determines, based on the first indication information, that the target BWP is the first initial BWP, the terminal device still camps in the first initial BWP, and monitors a paging message sent by the access network device.

For example, if the communication system includes an initial BWP with a bandwidth of 5 M and an initial BWP with a bandwidth of 10 M, the terminal device that accesses the communication system may camp on both the initial BWP with the bandwidth of 5 M and the initial BWP with the bandwidth of 10 M. After the terminal device camps on the initial BWP with the bandwidth of 5 M and reads the first indication information in the SIB1, where the first indication information indicates that the target BWP of the terminal device is the initial BWP with the bandwidth of 5 M, the terminal device still camps on the initial BWP with the bandwidth of 5 M.

It should be noted that, for a terminal device that can camp on both the first initial BWP and the second initial BWP, the access network device may indicate that the target BWP of the terminal device is the first initial BWP, or may indicate that the target BWP of the terminal device is the second initial BWP. This is not limited herein in this application.

Step S303. The access network device sends the paging message to the terminal device in the target BWP.

In this embodiment, a specific implementation process and an implementation principle of step S303 are similar to a specific implementation process and an implementation principle of step S203 in Embodiment 1, and details are not described herein again.

In this embodiment of this application, the first indication information may be carried in the system information block 1 SIB1, or may be carried on a first broadcast channel PBCH, so that the terminal device can directly camp in the target BWP, or may uniformly first camp in the first initial BWP and then determine whether to switch to another BWP. Based on the foregoing manner, the terminal device may determine the target BWP.

It should be understood that, sequence numbers of the foregoing processes do not mean an execution sequence. The execution sequence of the processes should be determined based on functions and internal logic of the processes. The sequence numbers should not constitute any limitation on the implementation processes of the embodiments of this application.

Based on the foregoing embodiment, the first indication information may indicate the target BWP of the terminal device in a plurality of manners.

In an optional implementation, the first indication information is used to indicate the target BWP, or the first indication information is identification information of the target BWP.

The identification information of the target BWP may be specifically status information of at least one bit, or the first indication information is bitmap information.

For example, that the identification information of the target BWP is the status information of the at least one bit is used as an example. If the communication system includes an initial BWP with a bandwidth of 5 M and an initial BWP with a bandwidth of 10 M, status information 0 of one bit may be used as an identifier of the initial BWP with the bandwidth of 5 M, and status information 1 of one bit is used as an identifier of the initial BWP with the bandwidth of 10 M. If the first indication information includes the status information 0 of the bit, it indicates that the target BWP of the terminal device is the initial BWP with the bandwidth of 5 M. If the first indication information includes the status information 1 of the bit, it indicates that the target BWP of the terminal device is the initial BWP with the bandwidth of 10 M. For a communication system in which a quantity of initial BWPs is more than two, status information of a plurality of bits may be used as an identifier of an initial BWP. For example, 00 is used as an identifier of the first initial BWP, 01 is used as the identifier of the first initial BWP, 10 is used as the identifier of the first initial BWP, and 11 is used as the identifier of the first initial BWP.

Figure 4:
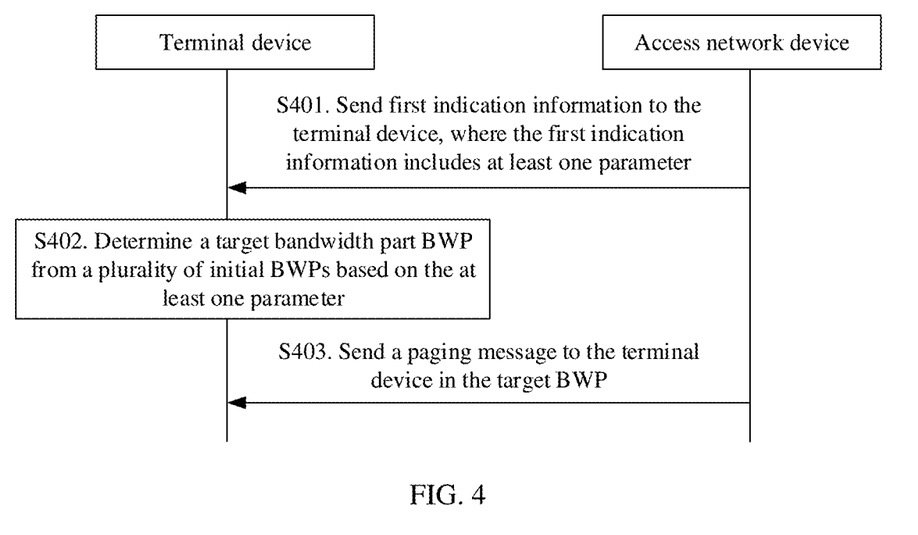
FIG. 4 is still another signaling exchanging diagram of a communication method according to an embodiment of this application.

In another optional implementation, the first indication information may include at least one parameter, and the terminal device determines the target BWP by using a first parameter. FIG. 4 is still another signaling exchanging diagram of a communication method according to an embodiment of this application. With reference to FIG. 4, the following describes in detail the communication method used when the first indication information includes at least one parameter. The method in this embodiment includes the following steps.

Step S401. An access network device sends first indication information to a terminal device, where the first indication information includes at least one parameter.

Step S402. The terminal device determines a target bandwidth part BWP from a plurality of initial BWPs based on the at least one parameter.

Step S403. The access network device sends a paging message to the terminal device in the target BWP.

In this embodiment, a specific implementation process and an implementation principle of step S403 are similar to a specific implementation process and an implementation principle of step S203 in Embodiment 1, and details are not described herein again.

In this embodiment, the target bandwidth part BWP is determined from the plurality of initial BWPs based on the at least one parameter. The parameter may be used to specify a camping proportion of the initial BWP, specify an initial BWP on which the terminal device cannot camp, or directly specify the target BWP of the terminal device. This is not limited in this embodiment of this application.

In an optional implementation, a communication system may preset a camping formula. After receiving the at least one parameter sent by the access network device, the terminal device may input the parameter into the camping formula, obtain a result output by the camping formula, and determine the target BWP of the terminal device based on the result output by the camping formula.

In addition, an initial BWP corresponding to the result output by the camping formula may be further determined according to a preset rule. For example, the preset rule may be as follows: The result output by the camping formula is in a one-to-one correspondence with the initial BWP, and the result output by the camping formula is compared with a parameter, where different comparison results correspond to different initial BWPs.

For example, the communication system includes a first initial BWP and a second initial BWP. Mode(UE_ID, n) may be used as the camping formula of the communication system. After receiving parameters n and m that are sent by the access network device, the terminal device may input the parameter n into the formula Mode(UE_ID, n), and compare a result of Mode(UE_ID, n) with the parameter m. If the result of Mode(UE_ID, n) is less than m, the target BWP of the terminal device is the first initial BWP. If the result of Mode(UE_ID, n) is greater than or equal to m, the target BWP of the terminal device is the second initial BWP.

For example, if the communication system includes the first initial BWP, the second initial BWP, and a third initial BWP, Mode(UE_ID, n) may be used as the camping formula of the communication system. After receiving parameters n, m1, and m2 that are sent by the access network device, the terminal device may input the parameter n into the formula Mode(UE_ID, n), and compare a result of Mode(UE_ID, n) with the parameters m1 and m2. If the result of Mode (UE_ID, n) is not less than m1, the target BWP of the terminal device is the first initial BWP. If the result of Mode(UE_ID, n) is greater than m1 and less than m2, the target BWP of the terminal device is the second initial BWP. If the result of Mode(UE_ID, n) is not less than m2, the target BWP of the terminal device is the third initial BWP.

It should be noted that the first indication information may include one or more parameters. This is not limited in this embodiment of this application. For example, when the preset camping formula includes two to-be-input parameters, the access network device may send the foregoing two parameters to the terminal device. Alternatively, one of the two parameters may be specified in advance, and the access network device sends only the other parameter to the terminal device.

In an optional implementation, the at least one parameter includes at least one parameter related to an identifier of the terminal device, and the target BWP of the terminal device is determined by using the parameter related to the identifier of the terminal device.

In this embodiment of this application, the first indication information may be used to determine the target BWP by using the parameter or identification information of the target BWP, so that the terminal device flexibly camps on the initial BWP, to implement load balancing in the initial BWP.

Figure 5:
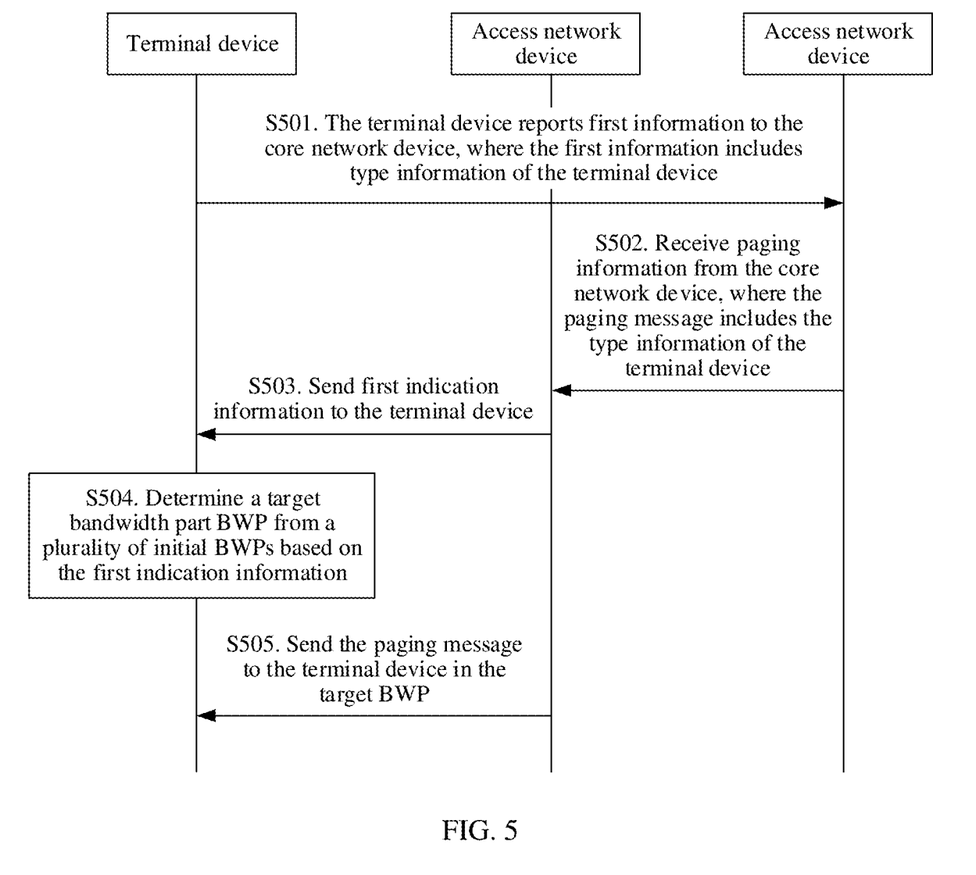
FIG. 5 is yet another signaling exchanging diagram of a communication method according to an embodiment of this application.

FIG. 5 is yet another signaling exchanging diagram of a communication method according to an embodiment of this application. Refer to FIG. 5. The method in this embodiment includes the following steps.

Step S501. A terminal device reports first information to a core network device, where the first information includes type information of the terminal device.

Step S502. An access network device receives paging information from the core network device, where the paging message includes the type information of the terminal device.

When the terminal device enters an idle (idle) state, the access network device deletes related information of the terminal device. Therefore, the terminal device cannot directly send the first information to the access network device, but needs to send the first information to the core network device, and then, the core network device delivers the first information to the access network device.

In this embodiment, the terminal device may report the type information of the terminal device to the core network device, so that when the core network device sends, to the access network device, paging directed to the terminal device, the type information of the terminal device can be carried in the paging message.

The terminal device may report the first information when the terminal device is registered with the core network device, may report the first information when a registration area of the core network device is updated, or may report the first information by using separate non-access network signaling. A time point at which the terminal device reports the first information and used signaling are not limited in this embodiment of this application.

In an optional implementation, the first information may further include information about a supported bandwidth. After receiving the type information of the terminal device and the information about the supported bandwidth, a network device may generate the first indication information based on the type information and the information about the supported bandwidth, to indicate the terminal device to camp on a supported initial BWP.

It should be understood that step S501 and step S502 are not necessarily performed before step S503, and step S501 and step S502 may be performed before or after any step of the communication method provided in this embodiment of this application. Sequence numbers of the processes in this embodiment do not constitute any limitation on the implementation processes of this embodiment of this application.

Step S501. The access network device sends the first indication information to the terminal device.

Step S502. The terminal device determines a target bandwidth part BWP from a plurality of initial BWPs based on the first indication information, where the initial BWP is used to page a terminal device that has not established a radio resource control RRC connection to the access network device.

In this embodiment, a specific implementation process and an implementation principle of step S501 and S502 are similar to a specific implementation process and an implementation principle of step S201 and step S202 in Embodiment 1, and details are not described herein again.

In this embodiment of this application, the terminal device reports the first information to the core network device, where the first information includes the type information of the terminal device. The access network device receives the paging information from the core network device, where the paging message includes the type information of the terminal device. Based on the foregoing manner, the access network device may obtain the type information of the terminal device, to implement precise paging.

A person of ordinary skill in the art may understand that all or some of the steps of the method embodiments may be implemented by a program instructing relevant hardware. The program may be stored in a computer-readable storage medium. When the program executes, the steps of the method embodiments are performed. The foregoing storage medium includes any medium that can store program code, such as a ROM, a RAM, a magnetic disk, or an optical disc.

Figure 6:
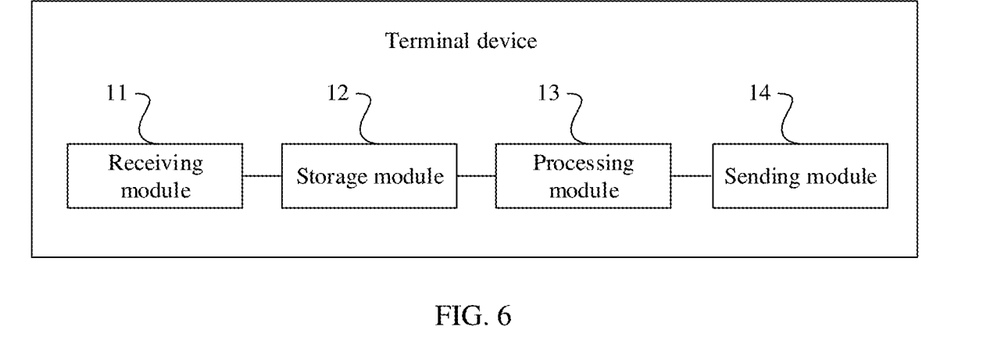
FIG. 6 is a schematic diagram of a structure of a terminal device according to an embodiment of this application.

FIG. 6 is a first schematic diagram of a structure of a communication apparatus according to an embodiment of this application. The communication apparatus may be configured to perform the method on the terminal device side in the embodiments shown in FIG. 2 to FIG. 5. The communication apparatus may be the terminal device itself, or may be an internal component or integrated circuit of the terminal device, for example, a chip. As shown in FIG. 6, the communication apparatus includes a receiving module 11, a storage module 12, and a processing module 13. The storage module 12 is coupled to the processing module 13, and is configured to store program instructions and/or data.

The receiving module 11 is configured to receive first indication information from an access network device.

The processing module 13 is configured to determine a target bandwidth part BWP from a plurality of initial BWPs based on the first indication information, where the initial BWP is used to page a terminal device that has not established a radio resource control RRC connection to the access network device.

The processing module 13 is further configured to monitor a paging message in the target BWP.

In a possible design, the first indication information is carried on a first broadcast channel PBCH.

In a possible design, the first indication information is carried in a system information block 1 SIB1.

In a possible design, the processing module 13 is further configured to read the SIB1 by the terminal device in a first initial BWP.

The processing module 13 is specifically configured to determine, based on the first indication information, that the target BWP is a second initial BWP, where the second initial BWP is different from the first initial BWP.

The first initial BWP and the second initial BWP belong to the plurality of initial BWPs.

In a possible design, the first indication information includes at least one parameter.

The processing module 13 is specifically configured to determine the target bandwidth part BWP from the plurality of initial BWPs based on the at least one parameter.

In a possible design, the at least one parameter includes at least one parameter related to an identifier of the terminal device.

In a possible design, the first indication information is used to indicate the target BWP, or the first indication information is identification information of the target BWP.

In a possible design, the first indication information includes status information of at least one bit, or the first indication information is bitmap information.

In a possible design, the terminal device further includes a sending module 14.

The sending module is configured to report first information to the access network device, where the first information includes type information of the terminal device.

In a possible design, the target BWP is corresponding to a type of the terminal device.

The communication apparatus provided in this embodiment of this application may perform actions of the terminal device in the foregoing method embodiments. An implementation principle and a technical effect thereof are similar. Details are not described herein again.

Figure 7:
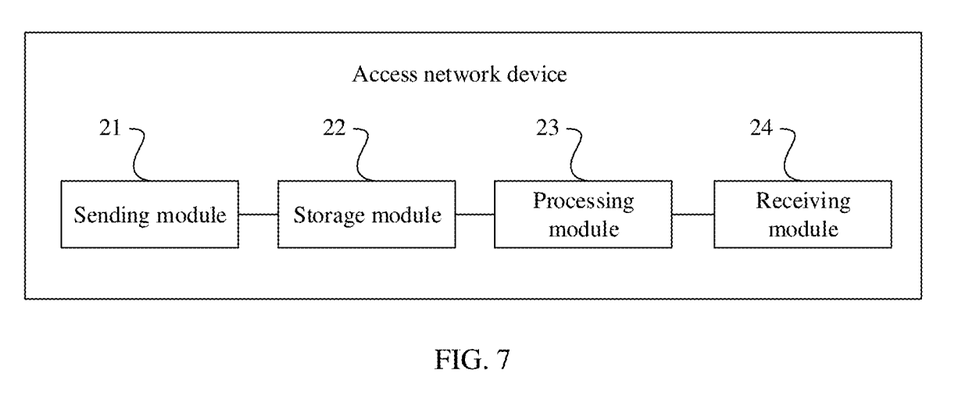
FIG. 7 is a schematic diagram of a structure of an access network device according to an embodiment of this application.

FIG. 7 is a second schematic diagram of a structure of a communication apparatus according to an embodiment of this application. The communication apparatus may be configured to perform the method on the access network device side in the embodiments shown in FIG. 2 to FIG. 5. The communication apparatus may be the access network device itself, or may be an internal component or integrated circuit of the access network device, for example, a chip. As shown in FIG. 7, the communication apparatus includes a sending module 21, a storage module 22, and a processing module 23. The storage module 22 is coupled to the processing module 23, and is configured to store program instructions and/or data.

The sending module 21 is configured to send first indication information to a terminal device, where the first indication information is used to indicate a target BWP in a plurality of initial BWPs, and the initial BWP is used to page a terminal device that has not established a radio resource control RRC connection to the access network device.

The processing module 23 is configured to send a paging message to the terminal device in the target BWP.

In a possible design, the access network device further includes a receiving module 24.

The receiving module 24 is configured to receive paging information from a core network device, where the paging message includes type information of the terminal device.

In a possible design, the target BWP is corresponding to a type of the terminal device.

In a possible design, the first indication information is carried on a first broadcast channel PBCH.

In a possible design, the first indication information is carried in a system information block 1 SIB1.

In a possible design, the sending module 21 is further configured to send the SIB1 in a first initial BWP.

The sending module 21 is specifically configured to send the paging message in a second initial BWP based on the first indication information, where the second initial BWP is different from the first initial BWP.

The first initial BWP and the second initial BWP belong to the plurality of initial BWPs.

In a possible design, the first indication information includes at least one parameter.

In a possible design, the at least one parameter includes at least one parameter related to an identifier of the terminal device.

In a possible design, the first indication information is used to indicate the target BWP, or the first indication information is identification information of the target BWP.

In a possible design, the first indication information includes status information of at least one bit, or the first indication information is bitmap information.

The communication apparatus provided in this embodiment of this application may perform actions of the access network device in the foregoing method embodiments. An implementation principle and a technical effect thereof are similar. Details are not described herein again.

Figure 8:
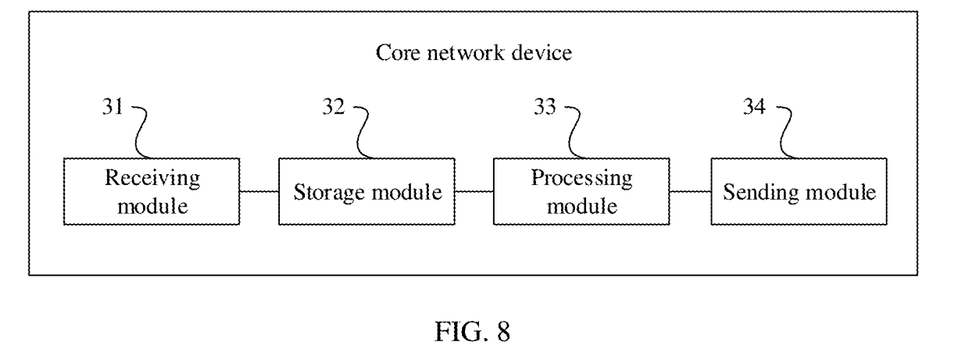
FIG. 8 is a schematic diagram of a structure of a core network device according to an embodiment of this application.

FIG. 8 is a third schematic diagram of a structure of a communication apparatus according to an embodiment of this application. The communication apparatus may be configured to perform the method on the core network device side in the embodiments shown in FIG. 2 to FIG. 5. The communication apparatus may be the core network device itself, or may be an internal component or integrated circuit of the core network device, for example, a chip. As shown in FIG. 8, the communication apparatus includes a receiving module 31, a storage module 32, a processing module 33, and a sending module 34. The processing module 33 is configured to execute a program, and the storage module 22 is coupled to the processing module 23, and is configured to store program instructions and/or data.

The receiving module 31 is configured to receive first information reported by a terminal device, where the first information includes type information of the terminal device.

The sending module 32 is configured to send a paging message to an access network device, where the paging message includes the type information of the terminal device.

In a possible design, the target BWP is corresponding to a type of the terminal device.

The communication apparatus provided in this embodiment of this application may perform actions of the core network device in the foregoing method embodiments. An implementation principle and a technical effect thereof are similar. Details are not described herein again.

Figure 9:
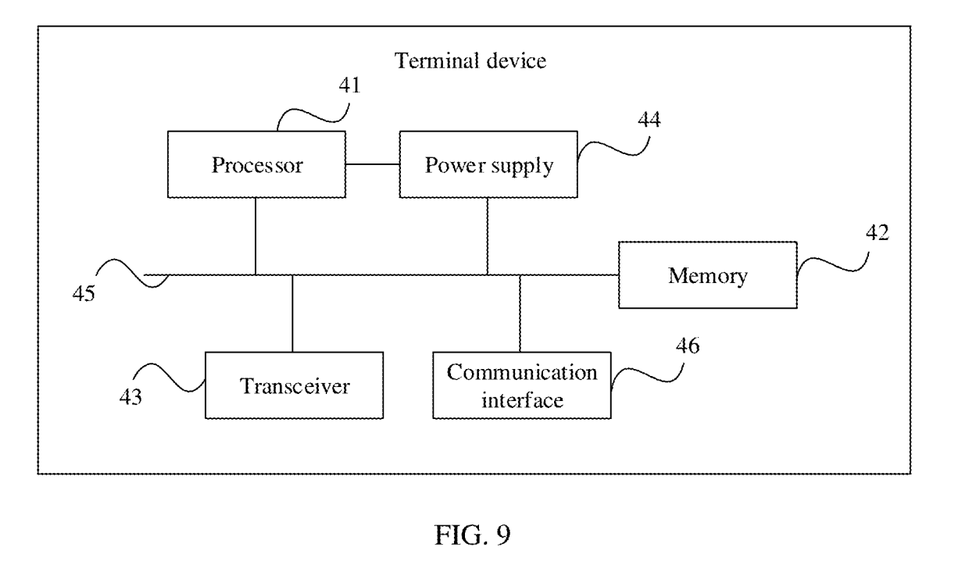
FIG. 9 is another schematic diagram of a structure of a terminal device according to an embodiment of this application.

FIG. 9 is a fourth schematic diagram of a structure of a communication apparatus according to an embodiment of this application. As shown in FIG. 9, the communication apparatus may include a processor 41 (for example, a CPU), a memory 42, and a transceiver 43. The transceiver 43 is coupled to the processor 41, and the processor 41 controls receiving and sending actions of the transceiver 43. The memory 42 may include a high-speed random access memory (random-access memory, RAM), and may further include a non-volatile memory (non-volatile memory, NVM), for example, at least one magnetic disk memory. The memory 42 may store various instructions, to complete various processing functions and implement method steps on the terminal device side in this application. In an implementation, the communication apparatus in this application may further include a power supply 44, a communication bus 45, and a communication port 46. The transceiver 43 may be integrated into a transceiver machine of the communication apparatus, or may be an independent transceiver antenna of the communication apparatus. The communication bus 45 is configured to implement communication connection between components. The communication port 46 is configured to implement connection and communication between the communication apparatus and other peripherals.

In this embodiment of this application, the memory 42 is configured to store computer-executable program code, and the program code includes instructions. When the processor 41 executes the instructions, the instructions enable the processor 41 of the communication apparatus to perform a processing action of the terminal device in the foregoing method embodiments, and enable the transceiver 43 to perform receiving and sending actions of the terminal device in the foregoing method embodiments. An implementation principle and a technical effect thereof are similar. Details are not described herein again.

Figure 10:
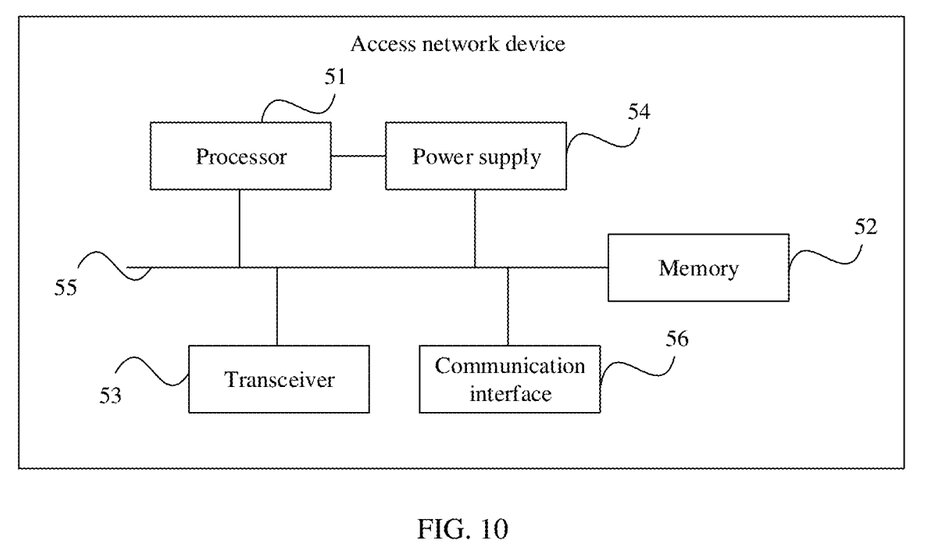
FIG. 10 is another schematic diagram of a structure of an access network device according to an embodiment of this application.

FIG. 10 is a fifth schematic diagram of a structure of a communication apparatus according to an embodiment of this application. As shown in FIG. 10, the communication apparatus may include a processor 51 (for example, a CPU), a memory 52, and a transceiver 53. The transceiver 53 is coupled to the processor 51, and the processor 51 controls receiving and sending actions of the transceiver 53. The memory 52 may include a high-speed random access memory (random-access memory, RAM), and may further include a non-volatile memory (non-volatile memory, NVM), for example, at least one magnetic disk memory. The memory 52 may store various instructions, to complete various processing functions and implement method steps on the access network device side in this application. In an implementation, the communication apparatus in this application may further include a power supply 54, a communication bus 55, and a communication port 56. The transceiver 53 may be integrated into a transceiver machine of the communication apparatus, or may be an independent transceiver antenna of the communication apparatus. The communication bus 55 is configured to implement communication connection between components. The communication port 56 is configured to implement connection and communication between the communication apparatus and other peripherals.

In this embodiment of this application, the memory 52 is configured to store computer-executable program code, and the program code includes instructions. When the processor 51 executes the instructions, the instructions enable the processor 51 of the communication apparatus to perform processing action of the access network device in the foregoing method embodiments, and enable the transceiver 53 to perform receiving and sending actions of the access network device in the foregoing method embodiments. An implementation principle and a technical effect thereof are similar. Details are not described herein again.

Figure 11:
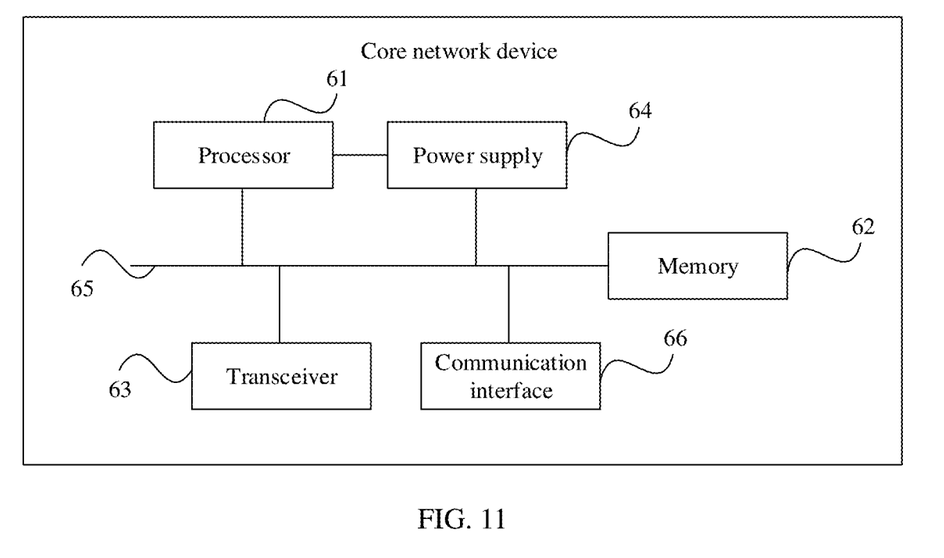
FIG. 11 is another schematic diagram of a structure of a core network device according to an embodiment of this application.

FIG. 11 is a sixth schematic diagram of a structure of a core network device according to an embodiment of this application. As shown in FIG. 11, the communication apparatus may include a processor 61 (for example, a CPU), a memory 62, and a transceiver 63. The transceiver 63 is coupled to the processor 61, and the processor 61 controls receiving and sending actions of the transceiver 63. The memory 62 may include a high-speed random access memory (random-access memory, RAM), and may further include a non-volatile memory (non-volatile memory, NVM), for example, at least one magnetic disk memory. The memory 62 may store various instructions, to complete various processing functions and implement method steps on the core network device side in this application. In an implementation, the communication apparatus in this application may further include a power supply 64, a communication bus 65, and a communication port 66. The transceiver 63 may be integrated into a transceiver machine of the core network device, or may be an independent transceiver antenna of the communication apparatus. The communication bus 65 is configured to implement communication connection between components. The communication port 66 is configured to implement connection and communication between the communication apparatus and other peripherals.

In this embodiment of this application, the memory 62 is configured to store computer-executable program code, and the program code includes instructions. When the processor 61 executes the instructions, the instructions enable the processor 61 of the communication apparatus to perform processing action of the core network device in the foregoing method embodiments, and enable the transceiver 63 to perform receiving and sending actions of the core network device in the foregoing method embodiments. An implementation principle and a technical effect thereof are similar. Details are not described herein again.

An embodiment of this application further provides a chip, including a processor and an interface. The interface is configured to input and output data or instructions processed by the processor. The processor is configured to perform the method on the terminal device side provided in the foregoing method embodiments. The chip may be used in a terminal device, may be used in an access network device, or may be used in a core network device.

An embodiment of this application provides a computer-readable storage medium. The computer-readable storage medium stores instructions. When the instructions are executed, a computer is enabled to perform the method performed by the terminal device in the foregoing embodiments of this application.

Alternatively, when the instructions are executed, a computer is enabled to perform the method performed by the access network device in the foregoing embodiments of this application.

Alternatively, when the instructions are executed, a computer is enabled to perform the method performed by the core network device in the foregoing embodiments of this application.

In the several embodiments provided in this application, it should be understood that the disclosed apparatuses and methods may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electronic form, a mechanical form, or another form.

It should be noted that in the embodiments of this application, division into modules is an example and is merely logical function division. During actual implementation, there may be another division manner. Function modules in the embodiments of this application may be integrated into one processing module, or each of the modules may exist alone physically, or two or more modules are integrated into one module. The integrated module may be implemented in a form of hardware, or may be implemented in a form of a software function module.

If the integrated module is implemented in the form of the software function module and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or a processor (processor) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

What is claimed is:

1. A communication method, wherein the method comprises:
    receiving, by a terminal device, first indication information from an access network device;
    determining, by the terminal device, a target bandwidth part (BWP) from a plurality of initial BWPs based on the first indication information, wherein the plurality of initial BWPs are useable to page the terminal device that has not established a radio resource control (RRC) connection to the access network device;
    receiving and monitoring, by the terminal device, a paging message in the target BWP from the access network, wherein the terminal device is not connected to the access network device by the RRC connection prior to receiving the paging message; and
    obtaining, by the terminal device, the first indication information from a first broadcast channel (PBCH), thereby causing the terminal device to receive, before camping on the initial BWP, the first indication information from the access network device.

2. The method according to claim 1, wherein the first indication information is included in a system information block (SIB1).

3. The method according to claim 2, wherein the method further comprises:
    reading, by the terminal device, the SIB1 in a first initial BWP of the plurality of initial BWPs; and the determining the target BWP from the plurality of
  initial BWPs based on the first indication information
  comprises:
    determining, based on the first indication information,
      that the target BWP is a second initial BWP of the
      plurality of initial BWPs, wherein the second initial
      BWP of the plurality of initial BWPs is different
      from the first initial BWP of the plurality of initial
      BWPs.
4. The method according to claim 1, wherein the first indication information comprises at least one parameter; and
  the determining the target BWP from the plurality of
    initial BWPs based on the first indication information
    comprises:
    determining the target BWP from the plurality of initial
      BWPs based on the at least one parameter.
5. The method according to claim 1, further comprising:
  reporting, by the terminal device, first information to a
    core network device, wherein the first information
    comprises type information of the terminal device.
6. A communication method, wherein the method comprises:
  sending, by an access network device, first indication
    information to a terminal device, wherein the first
    indication information indicates a target bandwidth part
    (BWP) in a plurality of initial BWPs, and the plurality
    of initial BWPs are useable to page a terminal device
    that has not established a radio resource control (RRC)
    connection to an access network device;
  sending, by the access network, a paging message to the
    terminal device in the target BWP, wherein the terminal
    device is not connected to the access network device by
    the RRC connection prior to the access network sending the paging message; and
  sending, by the access network device, the first indication
    information to the terminal device, wherein the terminal device obtains the first indication information from
    a first broadcast channel (PBCH), so that the terminal
    device receives, before camping on the initial BWP, the
    first indication information from the access network
    device.
7. The method according to claim 6, further comprising:
  receiving, by an access network device, paging information from a core network device, wherein the paging
    message comprises type information of the terminal
    device.
8. The method according to claim 7, wherein the target BWP corresponds to a type of the terminal device.
9. The method according to claim 6, wherein the first indication information is included in a system information block (SIB1).
10. The method according to claim 9, wherein before the sending the first indication information to the terminal device, the method further comprises:
  sending the SIB1 in a first initial BWP of the plurality of
    initial BWPs; and
  the sending the paging message to the terminal device in
    the target BWP comprises:
    sending the paging message in a second initial BWP of
      the plurality of initial BWPs based on the first
      indication information, wherein the second initial
      BWP of the plurality of initial BWPs is different
      from the first initial BWP of the plurality of initial
      BWPs.
11. A communication apparatus, comprising:
  one or more processors, and
  a memory configured to store non-transitory instructions;
  wherein, in response to being executed by the one or more
    processors, the non-transitory instructions cause the
    communication apparatus to:
  receive first indication information from an access network device; and
  determine a target bandwidth part (BWP) from a plurality
    of initial BWPs based on the first indication information, wherein the plurality of initial BWPs are useable
    to page a terminal device that has not established a
    radio resource control (RRC) connection to the access
    network device; and
  receive and monitor a paging message in the target BWP,
    wherein the communication apparatus is not connected
    to the access network device by the RRC connection
    prior to receiving the paging message; and
  obtain the first indication information from a first broadcast channel (PBCH) thereby causing the communication apparatus to receive·before camping on the initial
    BWP, the first indication information from the access
    network device.
12. The communication apparatus according to claim 11, wherein the first indication information is included in a system information block (SIB1).
13. The communication apparatus according to claim 11, wherein the non-transitory instructions further cause the communication apparatus to read the SIB1 in a first initial BWP of the plurality of initial BWPs; and
  the non-transitory instructions further cause the communications apparatus to determine, based on the first
    indication information, that the target BWP is a second
    initial BWP of the plurality of initial BWPs, wherein
    the second initial BWP of the plurality of initial BWPs
    is different from the first initial BWP of the plurality of
    initial BWPs.
14. The communication apparatus according to claim 11, wherein the first indication information comprises at least one parameter; and
  the non-transitory instructions further cause the communication apparatus to determine the target BWP from
    the plurality of initial BWPs based on the at least one
    parameter.
15. The communication apparatus according to claim 11, wherein the non-transitory instructions further cause the communication apparatus to:
  report first information to a core network device, wherein
    the first information comprises type information of the
    communications apparatus.
16. A communication apparatus, comprising:
  one or more processors, and
  a memory configured to store non-transitory instructions;
  wherein, in response to being executed by the one or more
    processors, the non-transitory instructions cause the
    communications apparatus to:
  send first indication information to a terminal device,
    wherein the first indication information indicates a
    target bandwidth part (BWP) in a plurality of initial
    BWPs, and the plurality of initial BWPs are useable to
    page a terminal device that has not established a radio
    resource control (RRC) connection to an access network device;
  send a paging message to the terminal device in the target
    BWP, wherein the terminal device is not connected to
    the communication apparatus by the RRC connection
    prior to the communication apparatus sending the paging message; and
  send the first indication information to the terminal
    device, wherein the terminal device obtains the first indication information from a first broadcast channel (PBCH), so that the terminal device receives, before camping on the initial BWP, the first indication information from the access network device.

17. The communication apparatus according to claim 16, wherein the non-transitory instructions further cause the communication apparatus to:
receive paging information from a core network device, wherein the paging message comprises type information of the terminal device.

18. The communication apparatus according to claim 17, wherein the target BWP corresponds to a type of the terminal device.

19. The communication apparatus according to claim 16, wherein the first indication information is included in a system information block (SIB1).

20. The communication apparatus according to claim 19, wherein the non-transitory instructions further cause the communication apparatus to send the SIB1 in a first initial BWP of the plurality of initial BWPs; and
the non-transitory instructions further cause the communication apparatus to send the paging message in a second initial BWP of the plurality of initial BWPs based on the first indication information, wherein the second initial BWP of the plurality of initial BWPs is different from the first initial BWP of the plurality of initial BWPs.

* * * * *